US011376781B2

(12) United States Patent
Fortenbacher et al.

(10) Patent No.: US 11,376,781 B2
(45) Date of Patent: Jul. 5, 2022

(54) TRANSPORT DEVICE

(71) Applicant: FEURER FEBRA GMBH, Brackenheim (DE)

(72) Inventors: Klaus Fortenbacher, Gernsbach (DE); Achim Goller, Malsch (DE); Markus Feurer, Muggensturm (DE)

(73) Assignee: Feurer Febra GMBH, Brackenheim (DE)

( * ) Notice: Subject to any disclaimer, the term of this patent is extended or adjusted under 35 U.S.C. 154(b) by 0 days.

(21) Appl. No.: 17/258,586

(22) PCT Filed: Jul. 17, 2019

(86) PCT No.: PCT/EP2019/069200
§ 371 (c)(1),
(2) Date: Jan. 7, 2021

(87) PCT Pub. No.: WO2020/016275
PCT Pub. Date: Jan. 23, 2020

(65) Prior Publication Data
US 2022/0134633 A1 May 5, 2022

(30) Foreign Application Priority Data

Jul. 18, 2018 (DE) .......................... 102018117396.2
Jul. 25, 2018 (DE) .......................... 102018117944.8
Jul. 30, 2018 (DE) .......................... 102018118373.9

(51) Int. Cl.
*B65D 6/18* (2006.01)
*B29C 53/04* (2006.01)
(Continued)

(52) U.S. Cl.
CPC .............. *B29C 53/04* (2013.01); *B29C 53/84* (2013.01); *B65D 11/1846* (2013.01);
(Continued)

(58) Field of Classification Search
CPC .......................... B65D 11/1846; B65D 19/06; B65D 21/0223; B65D 21/0224; B65D 25/04;
(Continued)

(56) References Cited

U.S. PATENT DOCUMENTS

2014/0231429 A1* 8/2014 Frankenberg ........ B65D 43/164
248/346.02
2014/0291356 A1* 10/2014 Schutz ................... B65D 61/00
222/462

(Continued)

FOREIGN PATENT DOCUMENTS

| CN | 106428890 A | 2/2017 |
| DE | 20013645 U1 | 2/2001 |

(Continued)

OTHER PUBLICATIONS

English Translation of the International Preliminary Report on Patentability dated Jan. 28, 2021 and issued in connection with PCT/EP2019/069200.

(Continued)

*Primary Examiner* — Don M Anderson
(74) *Attorney, Agent, or Firm* — Barnes & Thornburg, LLP

(57) ABSTRACT

The invention relates to a transport device (10) for piece goods, comprising a base part (14) which has a base plate (16) and side walls (18) which are elevated from the base plate (16) and are circumferential, the side walls (18) delimiting a placement surface of the base plate (16), a number of first compartments (22), wherein each of the first compartments (22) has circumferential walls (24) which each have a lower edge on the placement surface, an intermediate base (26) which bears on the first compartments (22) and has a downwardly projecting edge (28), which surrounds the first compartments (22) at upper edges (24b) of their circumferential walls (24), and an upwardly (Continued)

pointing further placement surface (30), a number of second compartments (32), wherein each of the second compartments (32) has circumferential walls (34) which each have a lower edge (34*a*) on the further placement surface (30), and wherein the first and second compartments (22, 32) are foldable for the purpose of volume reduction. The intermediate base (26) has two base parts (44, 46) which are connected to one another in an articulated manner, have each a part (50, 52) of the further placement surface (30) and are pivotable relative to one another about a pivot axis (48) up to a contact of the parts (50, 52) of the further placement surface (30), wherein each of the base parts (44, 46) has a rectangular or square contour, one side (56, 58) of which is shorter than both sides of the placement surface and the other side (60, 62) of which is shorter than at least one of the sides of the placement surface.

12 Claims, 9 Drawing Sheets

(51) Int. Cl.
| | | |
|---|---|---|
| *B29C 53/84* | (2006.01) | |
| *B65D 19/06* | (2006.01) | |
| *B65D 21/02* | (2006.01) | |
| *B65D 25/04* | (2006.01) | |
| *B65D 71/70* | (2006.01) | |
| *B65D 77/04* | (2006.01) | |
| *B29L 31/00* | (2006.01) | |

(52) U.S. Cl.
CPC ......... *B65D 19/06* (2013.01); *B65D 21/0223* (2013.01); *B65D 21/0224* (2013.01); *B65D 25/04* (2013.01); *B65D 71/70* (2013.01); *B65D 77/0466* (2013.01); *B29C 2793/0018* (2013.01); *B29C 2793/0036* (2013.01); *B29C 2793/0081* (2013.01); *B29L 2031/7178* (2013.01); *B65D 2519/0096* (2013.01); *B65D 2519/00338* (2013.01); *B65D 2519/00621* (2013.01); *B65D 2519/00666* (2013.01); *B65D 2519/00711* (2013.01); *B65D 2519/00815* (2013.01); *B65D 2519/00965* (2013.01); *B65D 2585/6882* (2013.01)

(58) Field of Classification Search
CPC ................ B65D 71/70; B65D 77/0466; B65D 2519/00273; B65D 2519/00278; B65D 2519/0029; B65D 2519/00323; B65D 2519/00; B65D 2519/0004; B65D 2519/00258; B65D 2519/00338; B65D 2519/00621; B65D 2519/00666; B65D 2519/00711; B65D 2519/00815; B65D 2519/0096; B65D 2519/00965; B65D 2585/6882; B65D 2519/00004; B65D 2519/00313
See application file for complete search history.

(56) References Cited

U.S. PATENT DOCUMENTS

| | | | |
|---|---|---|---|
| 2021/0031979 A1* | 2/2021 | Feurer | B65D 25/08 |
| 2021/0206412 A1* | 7/2021 | Lindström | B62B 3/003 |
| 2021/0237967 A1* | 8/2021 | Havener | B65D 88/121 |
| 2021/0284412 A1* | 9/2021 | Dhodapkar | B65D 19/385 |
| 2021/0285281 A1* | 9/2021 | Booker | E06B 9/174 |
| 2021/0370306 A1* | 12/2021 | Turner | G01N 35/00613 |
| 2022/0048705 A1* | 2/2022 | Erm | B65D 88/524 |
| 2022/0055796 A1* | 2/2022 | Vermeulen | B65D 19/44 |
| 2022/0097926 A1* | 3/2022 | Whitmire | B65D 21/0224 |
| 2022/0134633 A1* | 5/2022 | Fortenbacher | B65D 21/0224 220/4.33 |
| 2022/0135279 A1* | 5/2022 | Herbeck | B65D 19/0016 206/386 |

FOREIGN PATENT DOCUMENTS

| | | |
|---|---|---|
| DE | 10311593 A1 | 7/2004 |
| DE | 102011055676 A1 | 5/2013 |
| EP | 2507139 B1 | 2/2016 |

OTHER PUBLICATIONS

PCT International Search Report and Written Opinion completed by the ISA/EP on Nov. 8, 2019 and issued in connection with PCT/EP2019/069200.

* cited by examiner

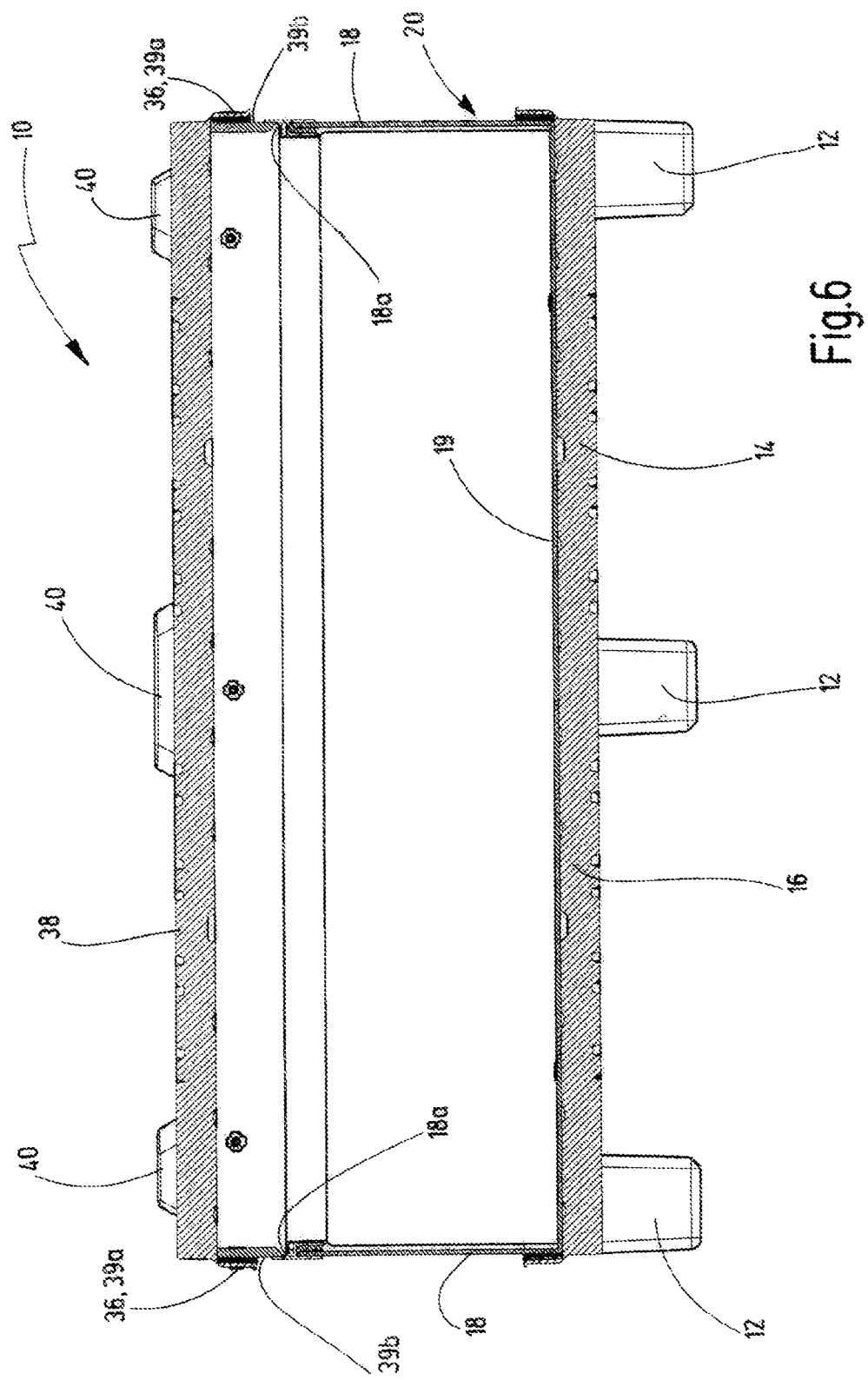

1
TRANSPORT DEVICE

CROSS-REFERENCE TO RELATED APPLICATIONS

This is a national stage entry of International Patent Application No. PCT/EP2019/069200, filed Jul. 17, 2019, which claims the benefit of and priority to German Patent Application Nos. 102018117396.2, 102018117944.8, and 102018118373.9, filed Jul. 18, 2018, Jul. 25, 2018, and Jul. 30, 2018 (respectively).

The invention relates to a transport device for piece goods in accordance with the preamble of claim 1.

Such transport devices are used for example for transporting components for the motor vehicle industry. On the base part, which can in particular take the form of a pallet, there are arranged a plurality of compartments which stand by way of the lower edges of their circumferential walls on the placement surface of the base plate. The compartments can be upwardly and/or downwardly open and usually have a receiving structure for the articles to be transported into which they can be placed in a scratch-proof and impact-proof manner. The side walls of the base part that run around prevent the compartments from slipping during transport. Moreover, they form, together with the base plate, an upwardly open container in which the compartments can be placed after emptying for return transport. For this purpose, the compartments are foldable for volume reduction. In order to be able to transport more compartments with the transport device, the first compartments standing on the base plate have placed thereon an intermediate base which engages by means of a downwardly protruding edge around said compartments at the upper edges of their circumferential walls, with the result that said intermediate base is secured against slipping. It is then possible for further, second compartments, which are as a rule identical to the first compartments, to be placed by way of the lower edges of their circumferential walls on a surface of the intermediate base that acts as a further placement surface. This device can be further extended by placing on the second compartments a further intermediate base on which then third compartments are placed, etc. However, a disadvantage with the previously known transport devices is that the intermediate base, by virtue of its dimensions, which correspond substantially to the outer contour of the side walls of the base part, cannot be placed between the side walls during returning transport after emptying. It therefore has to be transported back separately, which is perceived as impractical.

It is therefore the object of the invention to further develop a transport device of the type stated at the outset that can be handled better.

This object is achieved according to the invention by a transport device having the features of claim 1. Advantageous developments of the invention form the subject matter of the dependent claims.

The idea on which the invention is based is to configure the intermediate base to be foldable such that, in the folded state, it can be placed in the container formed by the base plate and the side walls of the base part. For this purpose, the intermediate base has two articulatedly interconnected base parts of which each has a portion of the further placement surface. The base parts are pivotable relative to one another about a pivot axis until the two portions of the further placement surface preferably lie flat on one another. Each of the base parts has a rectangular or square outline, wherein at least one of the sides is shorter than both sides of the likewise rectangular or square placement surface of the base plate and the other side of which is shorter than at least one of the sides of the placement surface. An intermediate base folded by pivoting the two base parts can then in each case be deposited between the side walls on the placement surface of the base plate by being rotated through 90° with respect to the position which it assumes in use when lying on the compartments.

In order to prevent slipping of the second compartments on the intermediate base, there is advantageously provision that the intermediate base has a number of teeth which are arranged at a distance from one another around the further placement surface and which protrude upwardly therefrom. It is preferred here that each tooth which is situated at a distance from the pivot axis that is not larger than the distance of the pivot axis from a side of the respective other base part that faces away from the base part bearing the tooth and that extends parallel to the pivot axis is assigned a cutout on the other base part that is dimensioned and arranged in such a way that, upon placement of the portions of the further placement surface against one another, the relevant tooth engages in the relevant cutout. In other words, each tooth which, upon pivoting of the two base parts relative to one another, would come to lie on the respective other base part is assigned in the latter a cutout in which it can engage. As opposed to an upwardly protruding, peripheral edge that would be impeding during pivoting of the base parts relative to one another and would prevent the portions of the further placement surface from bearing flat against one another, this configuration allows the one base part to be completely folded over with respect to the other base part and allows the two portions of the further placement surface to bear flat against one another. It is preferred here that each cutout, with mirror symmetry to the pivot axis, is assigned a tooth which is as large as the relevant cutout or smaller, with the result that said tooth can completely engage therein.

It is possible that the base parts are connected to one another in one piece by means of a film hinge which does not protrude from the further placement surface. Such a film hinge then causes no unevenness in the further placement surface that would be impeding during placement of the compartments by way of the lower edges of their circumferential walls. However, it is preferred that the two base parts are connected to one another by means of at least one hinge which has two rigid fastening elements of which in each case one is fixedly connected to the one base part and one is fixedly connected to the other base part, and which are pivotably connected to one another. Such hinges can be designed to be very stable. They expediently have their fastening elements fixed to the portions of the further placement surface. They can be connected to one another by means of inter-engaging hinge parts. However, it is preferred that they are connected to one another by means of a flexible connecting element which can consist of rubber, for example. Further preferred materials are polyvinylchloride (PVC) for the fastening elements and polypropylene (PP) for the base parts. Since the mounting of the fastening elements on the further placement surface gives rise to elevations of the further placement surface that can be impeding during placement of the second compartments, it is preferred that the at least one hinge does not extend over the entire width of the intermediate base. In particular, it is preferred that the two base parts are connected to one another by means of at least two hinges which are preferably structurally identical and arranged at a distance from one another. It is possible in this way that the lower edges of two circumferential walls belonging to different second compartments are arranged between in each case two mutually adjacent hinges and then do not have to be placed on the fastening elements but extend past the unevennesses caused thereby in the further placement surface. Furthermore, it is preferred that the second compartments do not contact the fastening elements but have the lower edges of their circumferential walls standing flush on the further placement surface.

There is expediently provision for a cover which lies on and engages around the upper edges of the second compartments and upwardly closes the second compartments. It is preferred here that the cover has a stacking edge which engages around the second compartments at their upper edges and that the side walls have at their mutually facing inner sides a shoulder which is dimensioned in such a way that the stacking edge can be placed thereon so as to engage between the side walls. In the retrieval position, the cover can then cover the container which is formed by the side walls and the base plate and in which the folded compartments and the folded intermediate base are placed.

During the production of such an intermediate base, it is advantageous for two base plates made of plastic which are preferably formed in one piece to be provided, from which base parts are produced. For this purpose, according to the invention, the cutouts are cut out of the base plates along closed first cutting lines, and contours for the teeth are cut out along second cutting lines extending from a starting point to an end point. The base plates are then heated along the bending lines connecting the starting points to the associated corner points, and the teeth are upwardly bent out of the surface along the bending lines. Furthermore, the base plates are heated along further bending lines, and edge portions forming the edge are folded downwardly along the further bending lines. Finally, the two base parts produced in such a way are connected to one another by means of at least one hinge forming the pivot axis in such a way that each tooth, with mirror symmetry to the pivot axis, is assigned a cutout which is as large as the relevant tooth or larger. It is preferred here that some of the bending lines coincide with at least one of the further bending lines and/or lie in a common plane.

The invention will be explained in more detail below on the basis of an exemplary embodiment which is schematically illustrated in the drawing, in which FIGS. 1a, 1b show a transport device in a transport position and in a retrieval position in perspective view;

FIG. 6 shows a transport device without compartments in the retrieval position in section.

Figure 5:
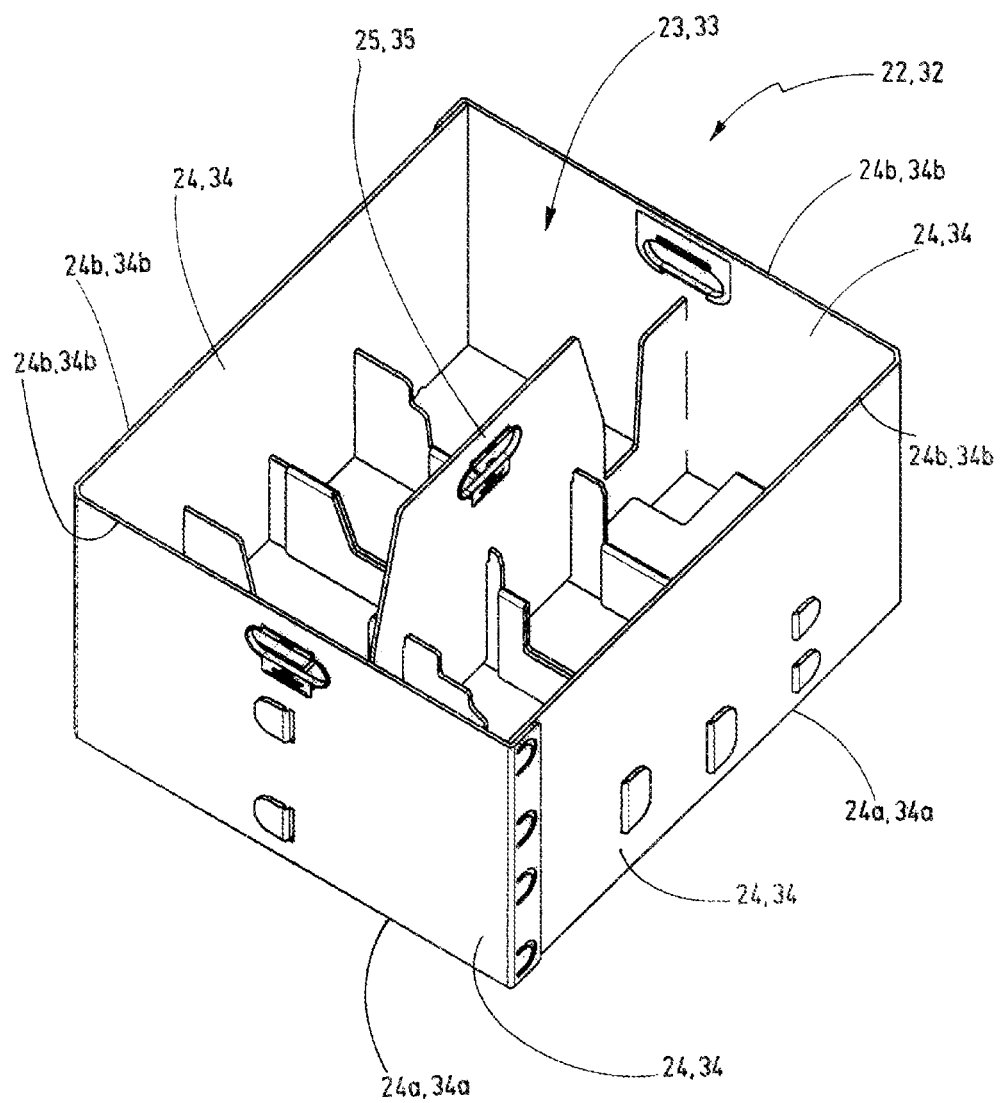
FIG. 5 shows a compartment in perspective view.

The transport device 10 illustrated in the drawing has a base part 14 with a base plate 16, said base part taking the form of a palette and having downwardly protruding feet 12. Projecting up from the base plate 16 are side walls 18 which run around a rectangular placement surface 19 and, together with the base plate 16, form an upwardly open container 20. In the exemplary embodiment shown, four first compartments 22 which protrude beyond the upper edges of the side walls 18 are arranged in said container. The first compartments 22 (FIG. 5) each have four circumferential walls 24 which enclose an upwardly and downwardly open receiving space 23. In each receiving space 23 there is arranged a receiving structure 25 for piece goods, in the exemplary embodiment shown for motor vehicle headlights. The first compartments 22 stand by way of lower edges 24a of their circumferential walls 24 on the placement surface. They are moreover foldable, with the result that they can be collapsed in a space-saving manner when no piece goods are received therein.

Figure 1A:
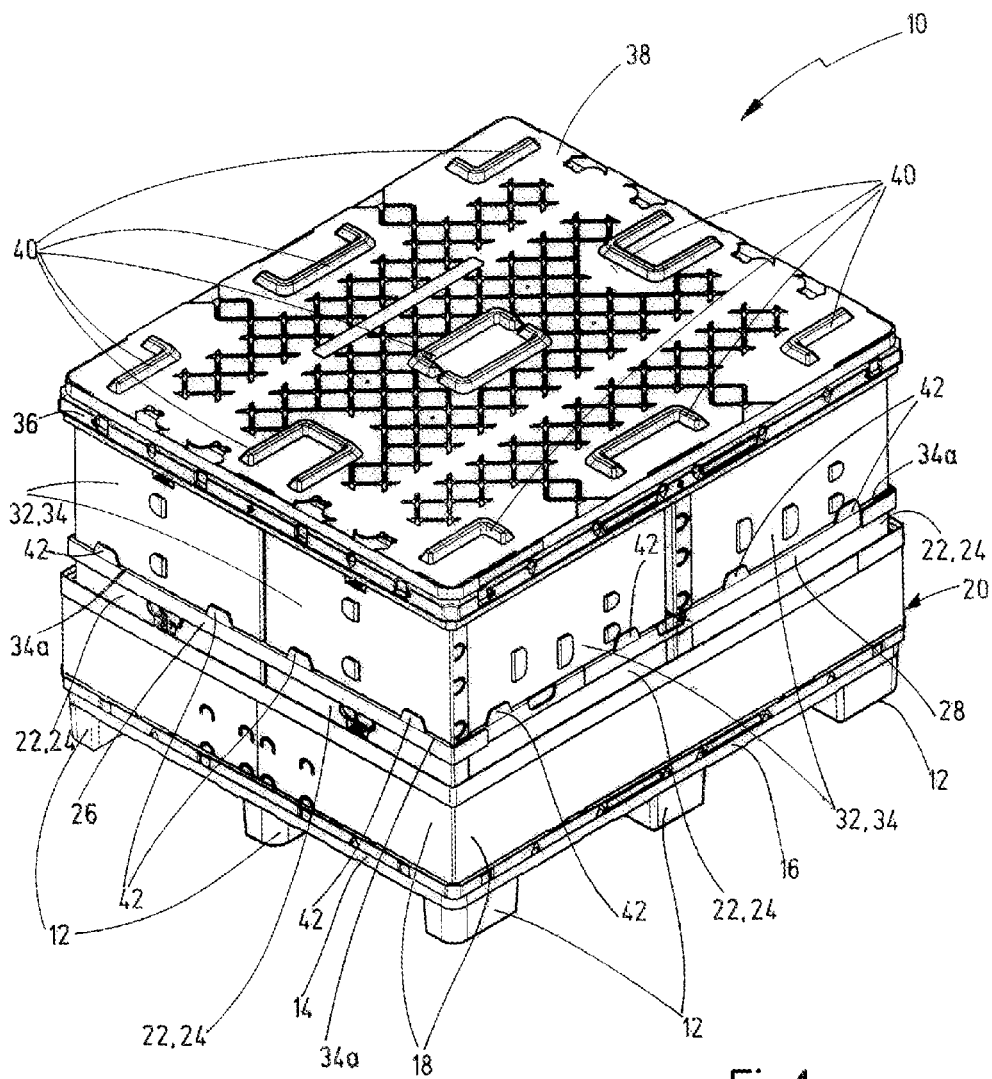
Figure 1B:
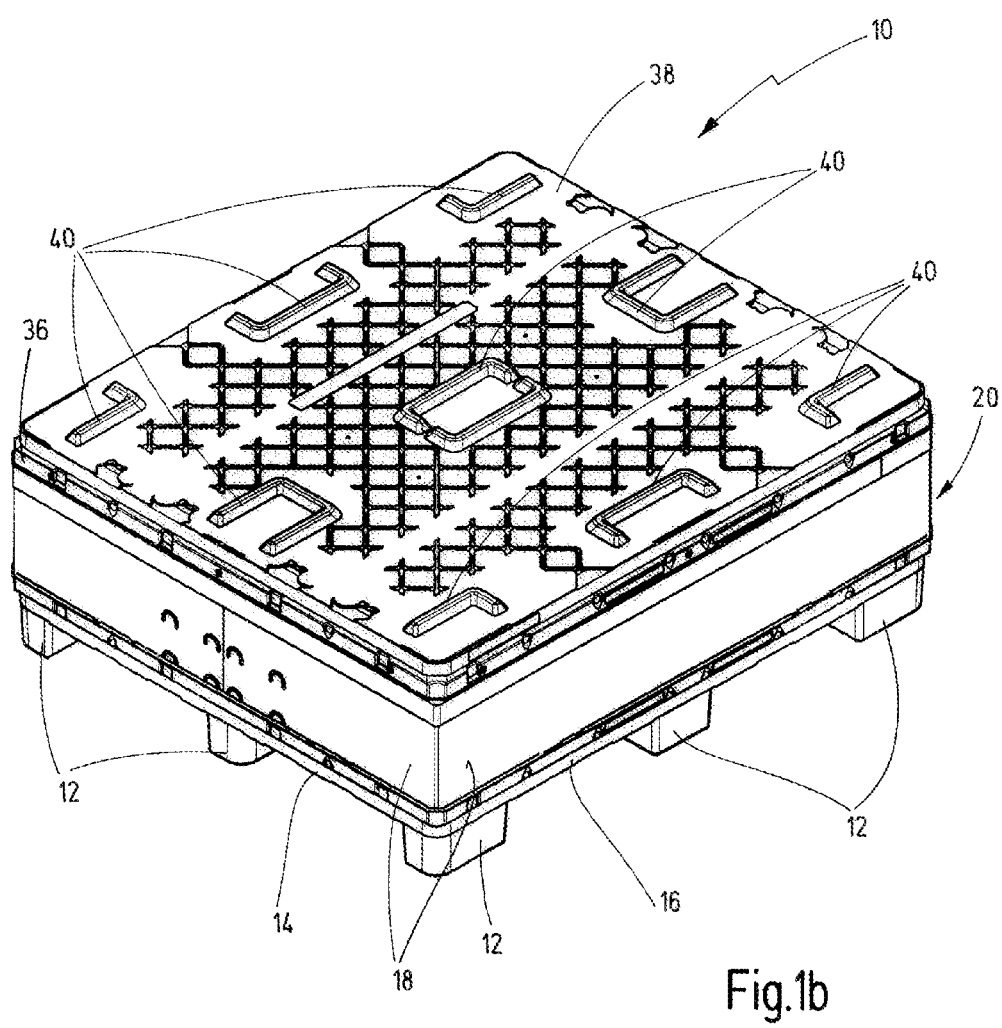
Figure 2A:
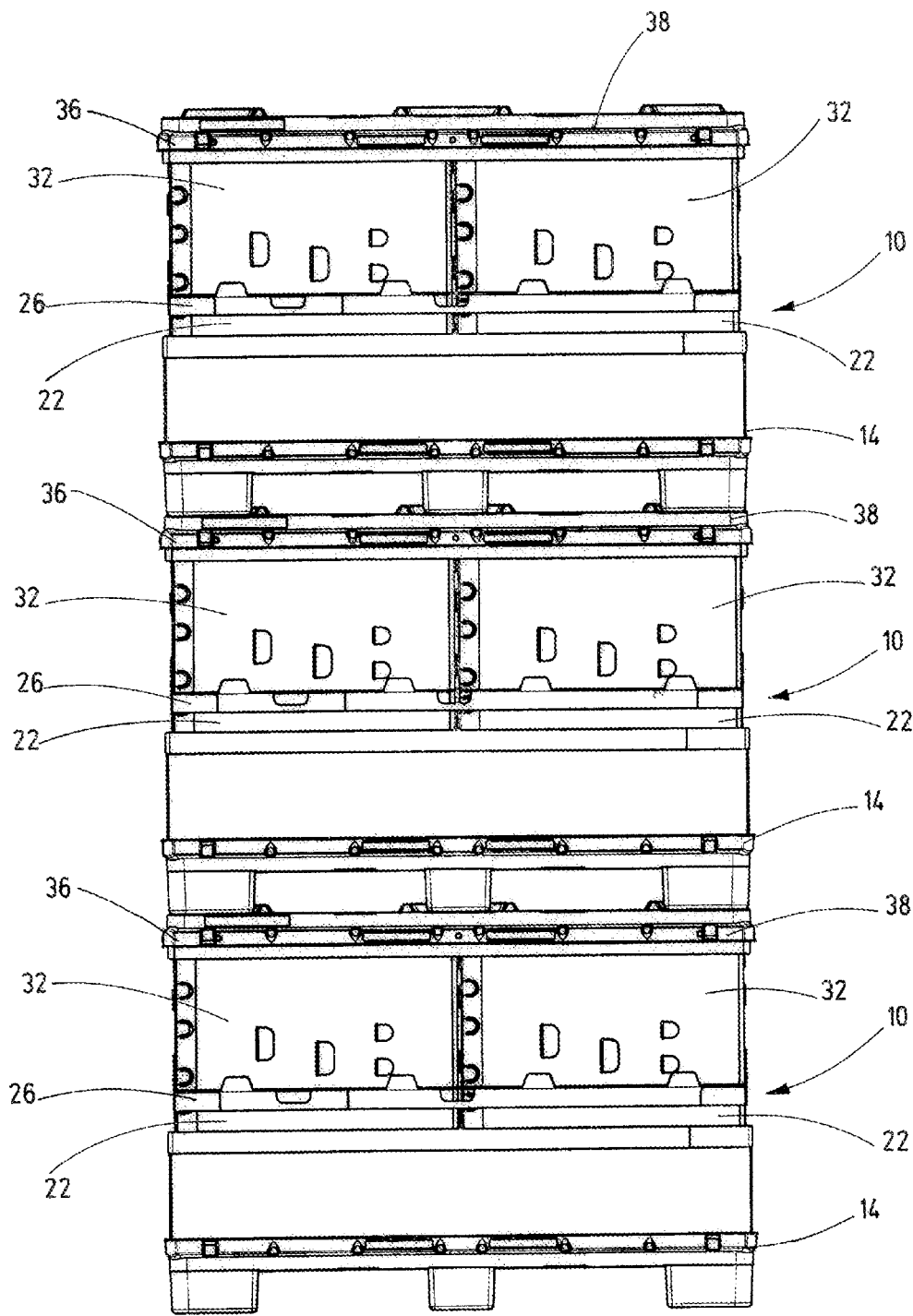
FIGS. 2a, 2b show a stack of a plurality of transport devices according to FIGS. 1a, 1b in the transport position and in the retrieval position in side view.
Figure 2B:
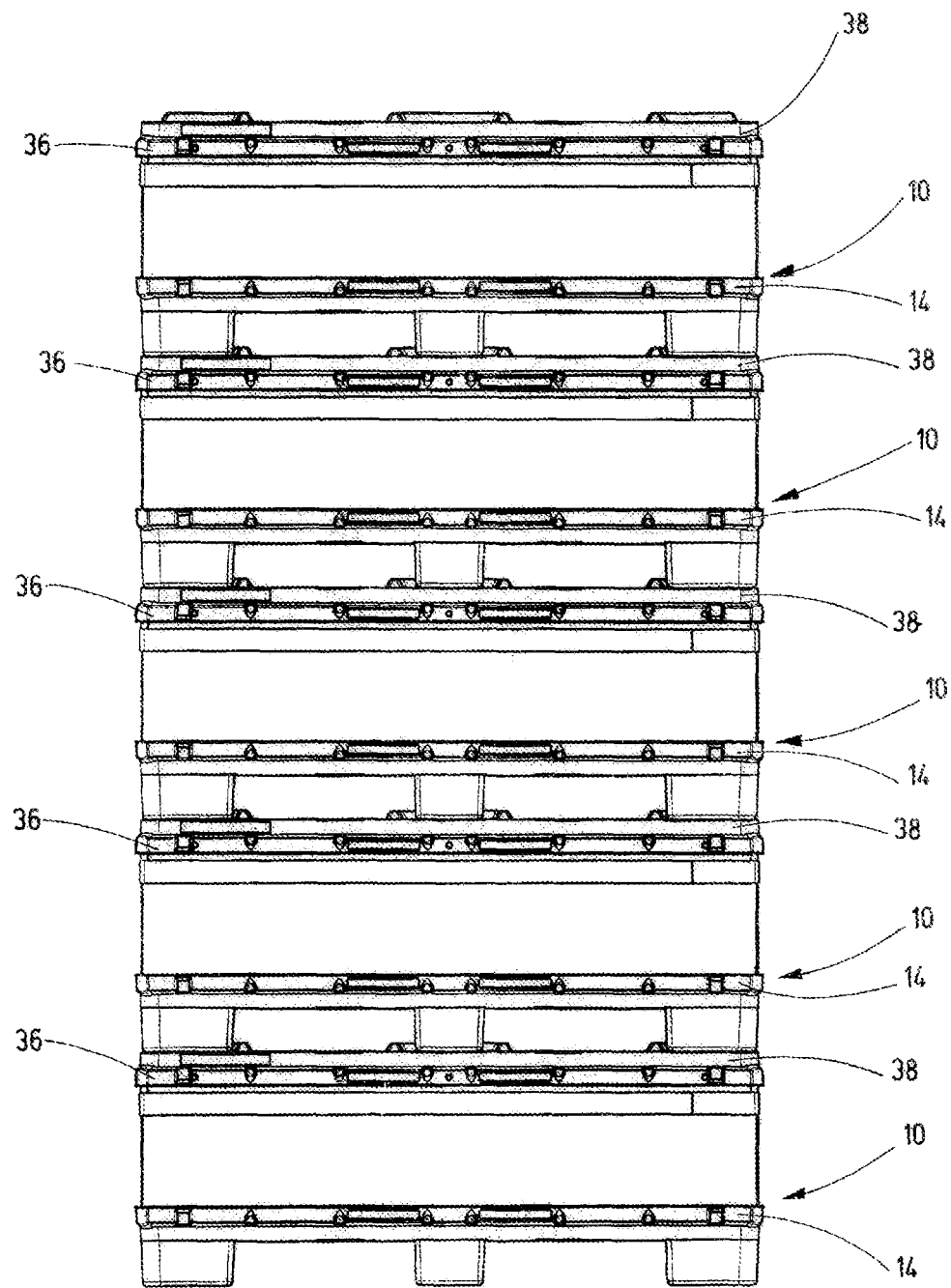

On the upper edges 24b of the circumferential walls 24 of the first compartments 22 there lies an intermediate base 26 which has a downwardly protruding, peripheral edge 28 which engages around the first compartments 22 at the upper edges 24b of their circumferential walls 24. The upper side of the intermediate base 26 has a further placement surface 30 on which four second compartments 32 are placed. In the exemplary embodiment shown, the second compartments 32 (FIG. 5) are designed to be structurally identical to the first compartments 22 and have a receiving space 33 for the piece goods that is enclosed by four circumferential walls 34 and in which there is arranged a receiving structure 35 for motor vehicle headlights. The circumferential walls 34 stand by way of their lower edges 34a on the further placement surface 30, whereas a cover 38 lies on their upper edges 34b and upwardly closes them. The cover 38 has a downwardly protruding, peripheral stacking edge 36 which has a first, integrally formed portion 39a and a ring 39b fitted into the first portion 39a. In the transport position, said ring engages around the upper edges 34b of the second compartments 32 and, in the retrievable position shown in FIGS. 1b, 6, lies on a shoulder 18a on the side walls 18. The cover 38 is provided on its upper side with holding contours 40 which are complementary to the feet 12, with the result that, as shown in FIG. 2a, a plurality of such transport devices 10 can be stacked on one another, wherein the holding contours 40 prevent the feet 12 from slipping on the respective cover 38. FIGS. 1a, 2a show in this respect a transport device 10 or a stack of three transport devices 10 in the transport position, in which the first and second compartments 22, 32 are unfolded to receive piece goods and stand on the placement surface or on the further placement surface 30 by way of the lower edges 24a, 34a of their circumferential walls 24, 34. FIGS. 1b, 2b show the transport device 10 or a stack with five transport devices 10, in which transport device or devices the first and second compartments 22, 32 have been collapsed after emptying and placed in the respective container 20 enclosed by the side walls 18. The cover 38 of the respective transport device 10 then lies on the shoulder 18a of the side walls 18. This position is referred to as the retrieval position in the present application.

Figure 3:
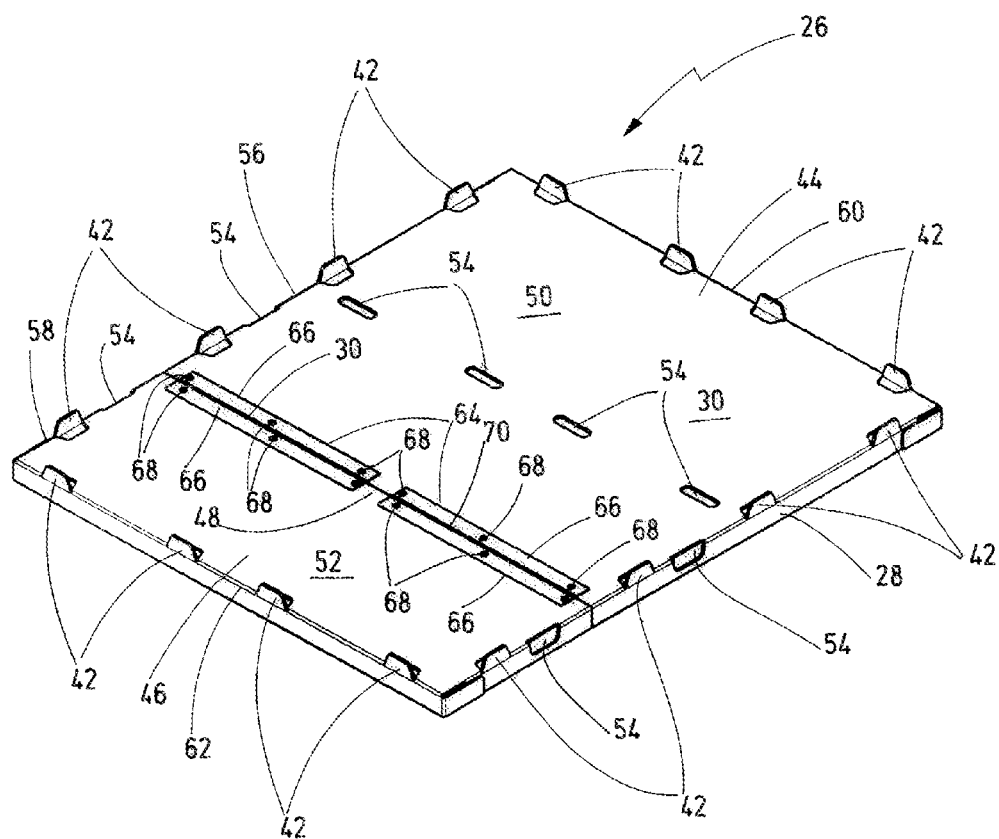
FIG. 3 shows an intermediate base in perspective view.

The intermediate base 26 has, as illustrated in detail in FIG. 3, a plurality of upwardly protruding teeth 42 which are flush with the edge 28, are arranged at a distance from one another, run around the border of the further placement surface 30 and prevent the further compartments 32 from slipping on the further placement surface 30. Since the further placement surface 30 is the same size as the placement surface on the base plate 16, the intermediate base 26 in the position illustrated in FIG. 3 is too large to be placed between the side walls 18 in the retrieval position of the transport device 10. For this reason, it is designed to be foldable with two differently sized base parts 44, 46 which are pivotable relative to one another with respect to a pivot axis 48. Each of the base parts 44, 46 has a portion 50, 52 of the further placement surface 30. The two base parts 44, 46 can be pivoted relative to one another until the surface portions 50, 52 bear flat, in that the intermediate base 26 has a cutout 54 for each of the teeth 42 that are not sufficiently far from the pivot axis 48 and, upon pivoting of the base parts 44, 46 about the pivot axis 48, would strike the respective other base parts 44, 46, said cutout being at least as large as the relevant tooth 42 and, in relation to the pivot axis 48, being arranged mirror-symmetrically with respect to the relevant tooth 42, with the result that said tooth can engage in the relevant cutout 54 when pivoting the base parts 44, 46 relative to one another. The cutouts 54 are situated in part in the further placement surface 30 and are situated in part at the edge of the further placement 30 and extend into the downwardly protruding edge 28. In the exemplary embodiment shown, all the teeth 42 are the same size and all the cutouts 44 are likewise the same size. The two base parts 44, 46 each have a rectangular outline. Here, the shorter side 56 of the first base part 44, just like the shorter side 58 of the second base part 46, is shorter than each of the two sides of the likewise rectangular placement surface. The longer side 60 of the first base part 44, just like the longer side 62 of the second base part 46, is shorter than the longer side of the placement surface. It is thus possible for the intermediate base with base parts 44, 46 pivoted relative to one another to be placed between the side walls 18 after a 90° rotation about a perpendicularly extending axis.

In the exemplary embodiment shown, the two base parts 44, 46 are connected to one another by means of two hinges 64. Each of the hinges 64 has two strip-shaped fastening elements 66 which are fastened to the base parts 44, 46 by means of rivets 68. Here, for each of the hinges 64, one of the fastening elements 66 is fastened to the first base part 44 and the other fastening element 66 is fastened to the second base part 46. Between the fastening elements 66, which are preferably manufactured from polyvinylchloride (PVC), there is arranged a flexible connecting element 70 made of rubber that connects the fastening elements 66. The two hinges 64 are arranged at such a distance from one another and at such a distance from the outer contour of the intermediate base 26 that the lower edges 34a of the circumferential walls 34 of the second compartments 32 run past them and stand directly on the further placement surface 30. The second compartments 32 do not contact the hinges 64.

Figure 4A:
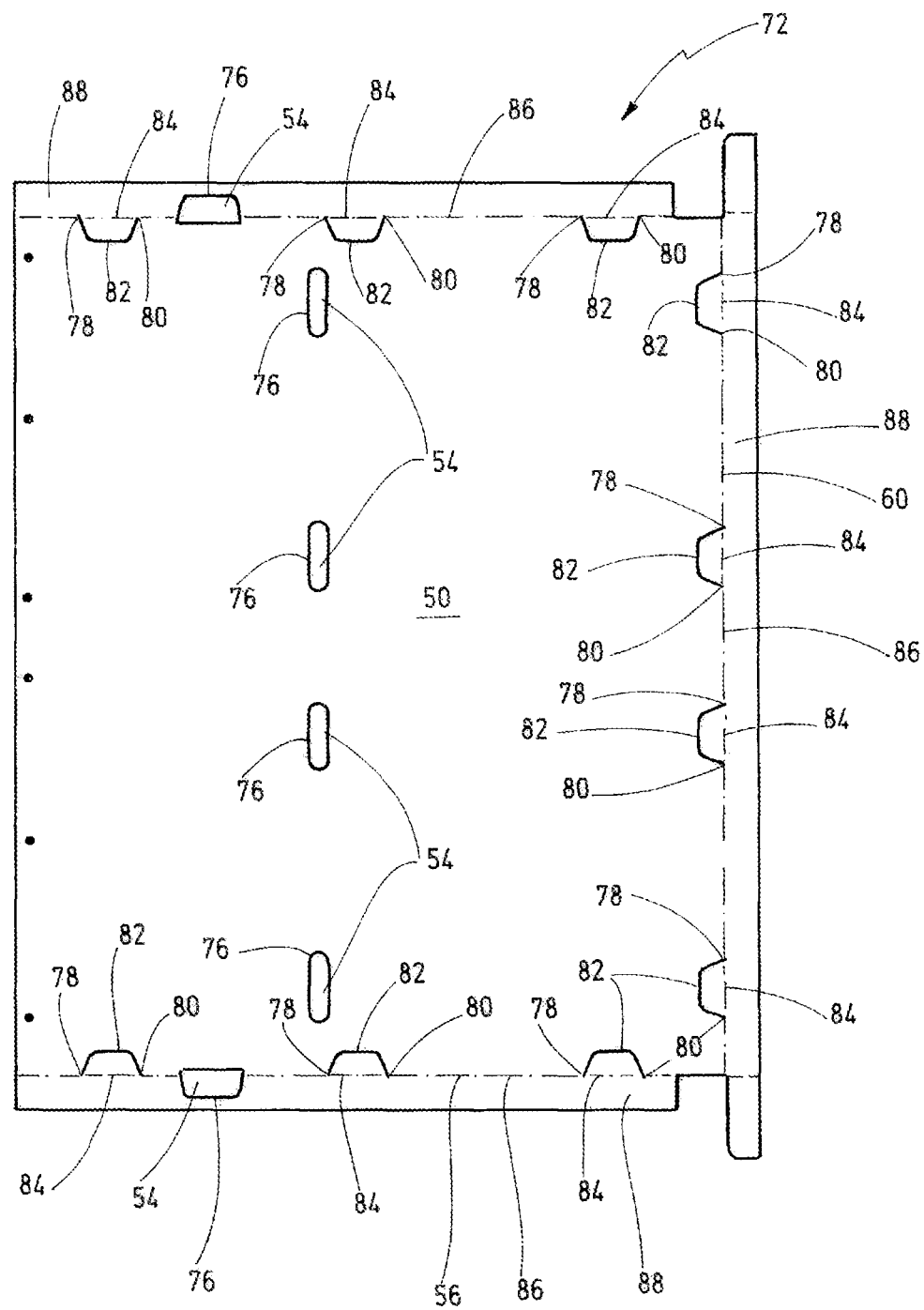
FIGS. 4a, 4b show two base plates for producing the intermediate base according to FIG. 3 in plan view.
Figure 4B:
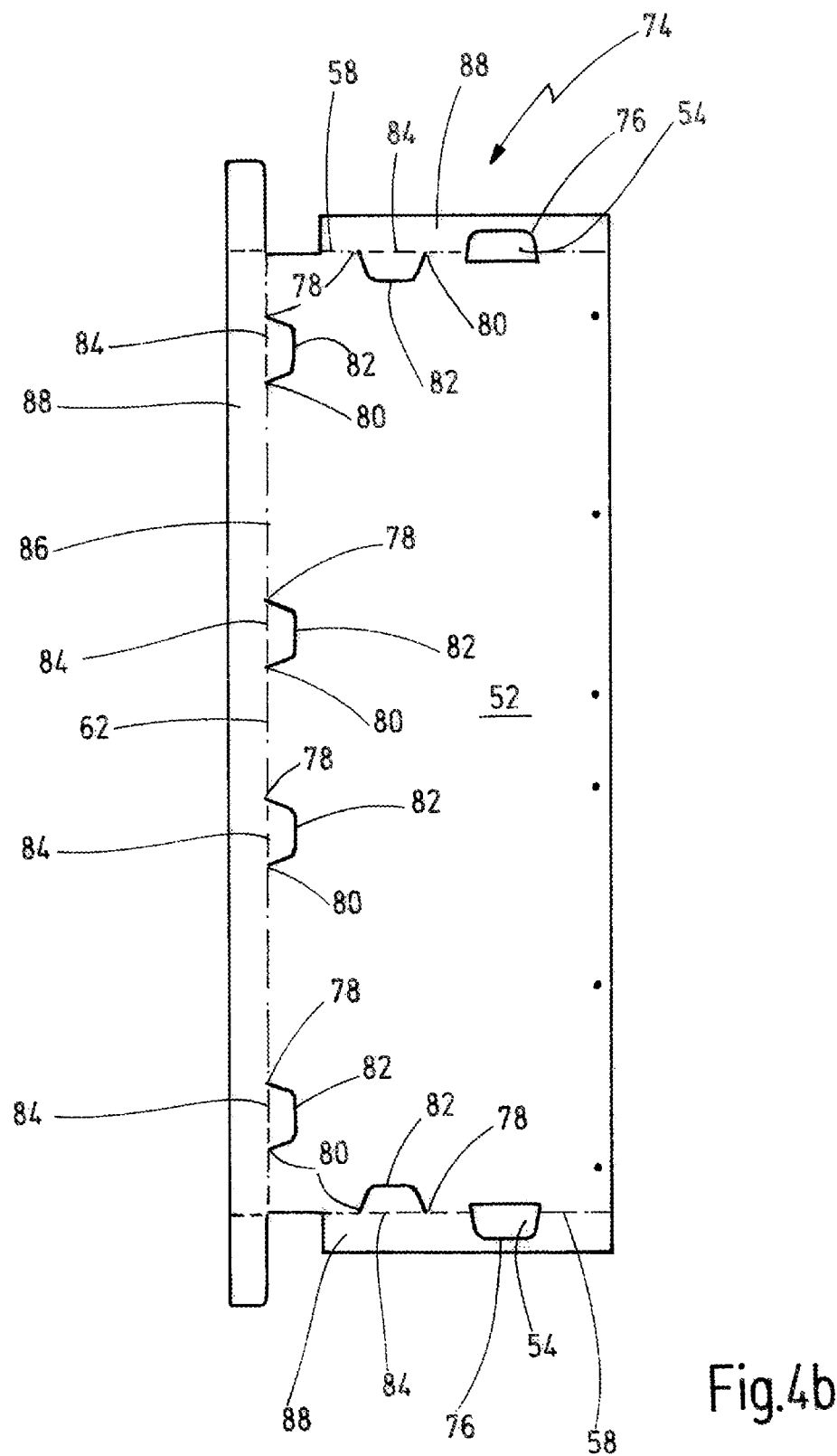

According to the exemplary embodiment shown, the intermediate base 26 is produced from two base plates 72, 74 which are shown in FIGS. 4a, 4b and which are each produced in one piece from polypropylene (PP). The cutouts 54 are cut out of each of the base plates 72, 74 along closed first cutting lines 76. Furthermore, contours for the teeth 42 are cut out along second cutting lines 82 extending from a starting point 78 up to an end point 80. The teeth 42 are bent out of the respective surface portions 50, 52 of the base plates 72, 74 in that the base plates 72, 74 are heated along bending lines 84 which each extend from one of the starting points 78 to the associated end point 80. Furthermore, edge portions 88 forming the edge 28 are bent downwardly about further bending lines 86. For this purpose, the respective base plate 72, 74 is heated along the further bending lines. In the exemplary embodiment shown, the bending lines 84 and the further bending lines 86 coincide or extend in a straight line.

In summary, the following can be asserted: the invention relates to a transport device 10 for piece goods, comprising: a base part 14 which has a base plate 16 and side walls 18 which project up from the base plate 16 and run around at least in certain portions, wherein the side walls 18 delimit a rectangular or square placement surface of the base plate 16; a number of first compartments 22 for receiving piece goods, wherein each of the first compartments 22 has circumferential walls 24 which each stand by way of a lower edge on the placement surface and which enclose a receiving space; an intermediate base 26 which lies on the first compartments 22 and which has a downwardly protruding edge 28 which runs around at least in certain portions and engages around the first compartments 22 at upper edges 24b of their circumferential walls 24; and an upwardly pointing further placement surface 30; a number of second compartments 32, wherein each of the second compartments 32 has circumferential walls 34 which each stand by way of a lower edge 34a on the further placement surface 30 and which enclose a receiving space, and wherein the first and second compartments 22, 32 are foldable for the purpose of volume reduction. According to the invention, there is provision that the intermediate base 26 has two articulatedly interconnected base parts 44, 46 which each have a portion 50, 52 of the further placement surface 30 and can be pivoted relative to one another about a pivot axis 48 until the portions 50, 52 of the further placement surface 30 bear against one another, wherein each of the base parts 44, 46 has a rectangular or square outline whose one side 56, 58 is shorter than both sides of the placement surface and whose other side 60, 62 is shorter than at least one of the sides of the placement surface.

The invention claimed is:

1. A transport device for piece goods, comprising:
   a base part which has a base plate and side walls which project up from the base plate and run around at least in certain portions of the base plate, wherein the side walls delimit a rectangular or square placement surface of the base plate;
   a number of first compartments for receiving piece goods, wherein each of the first compartments has circumferential walls which each stand by way of a lower edge on the placement surface and which enclose a respective first receiving space;
   an intermediate base which lies on the first compartments and which has a downwardly protruding edge, which runs around at least in certain portions and engages around the first compartments at upper edges of the respective circumferential walls, and an upwardly pointing further placement surface;
   a number of second compartments, wherein each of the second compartments has circumferential walls which each stand by way of a lower edge on the further placement surface and which enclose a respective second receiving space, and wherein the first and second compartments are foldable to reduce a volume thereof,
   wherein the intermediate base has two articulatedly interconnected base parts which each have a portion of the further placement surface and are pivotable relative to one another about a pivot axis until the portions of the further placement surface bear against one another,
   and wherein each of the two interconnected base parts has a rectangular or square outline with one side shorter than both sides of the placement surface and with another side shorter than at least one of the sides of the placement surface.

2. The transport device as claimed in claim 1, wherein the intermediate base has a number of teeth which are arranged at a distance from one another around the further placement surface and protrude upwardly therefrom.

3. The transport device as claimed in claim 2, wherein each tooth which is situated at a distance from the pivot axis that is not larger than the distance of the pivot axis from a side of one of the two interconnected base parts that faces away from the other of the two interconnected base parts bearing the tooth and that extends parallel to the pivot axis is assigned a cutout on the one of the two interconnected base parts that is dimensioned and arranged in such a way that, upon bearing of the portions of the further placement surface against one another, the relevant tooth engages in the relevant cutout.

4. The transport device as claimed in claim 3, wherein each cutout is assigned, with mirror symmetry to the pivot axis, a tooth which is as large as the relevant cutout or smaller.

5. The transport device as claimed in claim 1, wherein the two interconnected base parts are connected to one another in one piece by a film hinge which does not protrude from the further placement surface.

6. The transport device as claimed claim 1, wherein the two interconnected base parts are connected to one another by at least one hinge which has two rigid fastening elements, of which in each case one is fixedly connected to one of the two interconnected base parts and another is fixedly connected to the other of the two interconnected base parts, and which are pivotably connected to one another.

7. The transport device as claimed in claim 6, wherein the fastening elements are connected to one another by a flexible connecting element comprising rubber.

8. The transport device as claimed in claim 6, wherein the two interconnected base parts are connected to one another by at least two hinges which are structurally identical and arranged at a distance from one another.

9. The transport device as claimed in claim 8, wherein the lower edges of two of the circumferential walls belonging to different ones of the second compartments are arranged between in each case two mutually adjacent ones of the at least two hinges.

10. The transport device as claimed in claim 6, wherein the second compartments do not contact the fastening elements.

11. The transport device as claimed in claim 1, further comprising a cover which lies on and engages around the upper edges of the second compartments.

12. The transport device as claimed in claim 11, wherein the cover has a stacking edge which engages around the second compartments at the upper edges thereof, and wherein the side walls have at mutually facing inner sides thereof a shoulder which is dimensioned in such a way that the stacking edge can be placed thereon so as to engage between the side walls.

\* \* \* \* \*